United States Patent
Chu et al.

(10) Patent No.: US 7,855,984 B2
(45) Date of Patent: Dec. 21, 2010

(54) WIRELESS COMMUNICATION DEVICE

(75) Inventors: Teng-Huei Chu, Taipei Hsien (TW); Ping Li, Shenzhen (TW); Kai Lai, Shenzhen (TW); Er-Wei Li, Shenzhen (TW); Chong Zhang, Shenzhen (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 121 days.

(21) Appl. No.: 12/420,808

(22) Filed: Apr. 8, 2009

(65) Prior Publication Data
US 2010/0157855 A1    Jun. 24, 2010

(30) Foreign Application Priority Data
Dec. 24, 2008    (CN) .................. 2008 2 0303653

(51) Int. Cl.
*H04J 1/00* (2006.01)
*H04W 4/00* (2009.01)
*H04B 1/44* (2006.01)

(52) U.S. Cl. ............... 370/281; 370/334; 455/78
(58) Field of Classification Search .............. None
See application file for complete search history.

(56) References Cited

U.S. PATENT DOCUMENTS

| 5,010,583 | A  * | 4/1991 | Parken ............... 455/9 |
|---|---|---|---|
| 5,768,691 | A  * | 6/1998 | Matero et al. ........ 455/78 |
| 5,815,804 | A  * | 9/1998 | Newell et al. ........ 455/78 |
| 7,676,244 | B2 * | 3/2010 | Park et al. ......... 455/552.1 |
| 7,693,094 | B2 * | 4/2010 | Shin et al. ........... 370/280 |
| 2002/0004375 | A1 * | 1/2002 | Spencer et al. ...... 455/277.1 |
| 2010/0090777 | A1 * | 4/2010 | Song et al. .......... 333/101 |
| 2010/0210223 | A1 * | 8/2010 | Gorbachov ........... 455/78 |

* cited by examiner

*Primary Examiner*—Nittaya Juntima
(74) *Attorney, Agent, or Firm*—Frank R. Niranjan

(57) ABSTRACT

A wireless communication device includes a transceiving module, an antenna module, and a switch module. The transceiving module includes a first transceiver and a second transceiver. The antenna module includes at least a first antenna for transmitting electromagnetic signals in a first frequency range. The switch module switches different connections between the antenna module and the transceiving module, and includes a first switch, a second switch, a third switch, a fourth switch, and a first duplexer.

17 Claims, 3 Drawing Sheets

WIRELESS COMMUNICATION DEVICE

BACKGROUND

1. Technical Field

Embodiments of the present disclosure relate to wireless communication, and more particularly to a wireless communication device.

2. Description of Related Art

With developments in wireless communication technology, increasing numbers of wireless communication devices support multiple bands. For example, a computer may support both wireless local area network (WLAN) and worldwide interoperability for microwave access (WiMAX) protocols. In addition, developments in technology regarding multiple antennas allow most of such wireless communication devices to employ multiple antennas, thereby providing multiple signal transmission paths. However, it is complicated to achieve functional multiple signal transmission path activity in such wireless communication devices.

DETAILED DESCRIPTION

Figure 1:
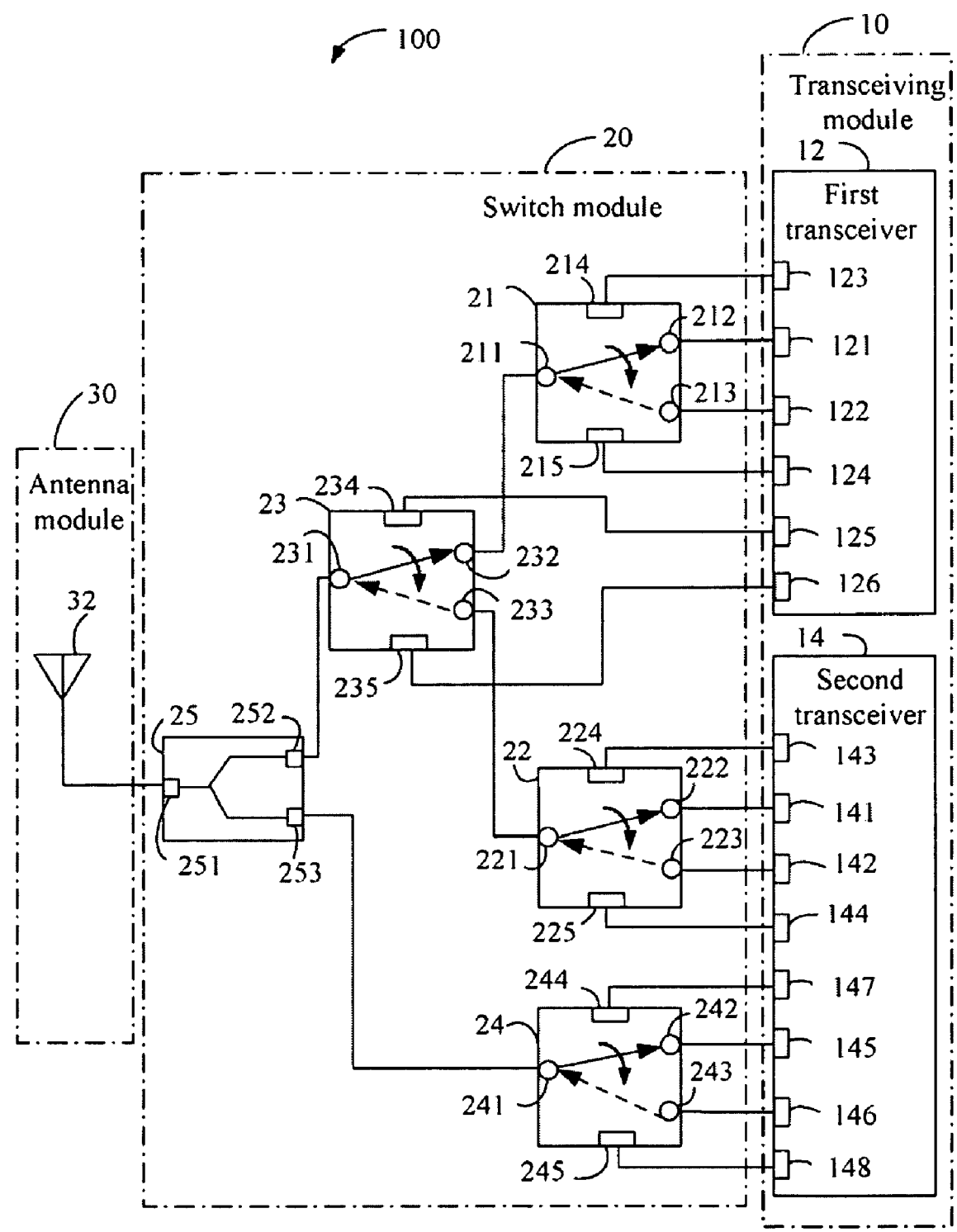
FIG. 1 is a circuit diagram of a first embodiment of a wireless communication device according to the present disclosure.

Referring to FIG. 1, a circuit diagram of a first embodiment of a wireless communication device 100 is shown. In one embodiment, the wireless communication device 100, may be a network adapter or a mobile phone that supports wireless local area network (WLAN) and worldwide interoperability for microwave access (WiMAX) capability. Alternatively, the wireless communication device 100 may be a network adapter or mobile phone supporting BLUETOOTH (BT) and ultra wideband (UWB) capabilities. In one embodiment, working frequency bands of WLAN and BT are approximately 2.4 GHz, working frequency bands of WiMAX range from 2.3 GHz to 2.5 GHz and approximately 3.5 GHz, and working frequency bands of UWB range from 3.1 GHz to 4.8 GHz. Alternatively, the wireless communication device 100 may be any other device that supports other frequency bands.

The wireless communication device 100 includes a transceiving module 10, a switch module 20, and an antenna module 30.

The transceiving module 10 includes a first transceiver 12 and a second transceiver 14. Here, the first transceiver 12 may be a single input single output (SISO) chipset that supports WLAN wireless communication. The first transceiver 12 comprises an input 121, an output 122, a first control terminal 123, a second control terminal 124, a third control terminal 125, and a fourth control terminal 126. The second transceiver 14 may be a multiple input multiple output (MIMO) chipset that supports WiMAX wireless communication. The second transceiver 14 comprises a first input 141, a first output 142, a first control terminal 143, a second control terminal 144, a second input 145, a second output 146, a third control terminal 147, and a fourth control terminal 148. Alternatively, the first transceiver 12 and the second transceiver 14 may be chipsets that support BT and UWB wireless communication, respectively.

The antenna module 30 comprises a first antenna 32. In one embodiment, he first antenna 32 supports both WLAN and WiMAX in cooperation, that is, working frequency bands of the first antenna 32 include approximately 2.4 GHz and 3.5 GHz. Alternatively, the first antenna 32 may support WLAN and WiMAX by a time-division means, that is, working frequency bands of the first antenna 32 range from 2.3 GHz to 2.5 GHz including 2.4 GHz. Alternatively, the first antenna 32 may support both BT and UWB in cooperation, that is, working frequency bands of the first antenna 32 include 2.4 GHz and frequency bands ranging from 3.1 GHz to 4.8 GHz.

The switch module 20 is configured for switching different connections between the transceiving module 10 and the antenna module 30. The switch module 20 comprises a first switch 21, a second switch 22, a third switch 23, a fourth switch 24, and a first duplexer 25. In the illustrated embodiment, the first switch 21, the second switch 22, the third switch 23 and the fourth switch 24 are single-pole-double-throw (SPDT) switches.

The first switch 21 comprises a first terminal 212, a second terminal 213, a third terminal 211, a first control terminal 214, and a second control terminal 215. The second switch 22 comprises a first terminal 222, a second terminal 223, a third terminal 221, a first control terminal 224, and a second control terminal 225. The third switch 23 comprises a first terminal 232, a second terminal 233, a third terminal 231, a first control terminal 234, and a second control terminal 235. The fourth switch 24 comprises a first terminal 242, a second terminal 243, a third terminal 241, a first control terminal 244, and a second control terminal 245. In one embodiment, the third terminal 211 of the first switch 21, the third terminal 221 of the second switch 22, the third terminal 231 of the third switch 23, and the third terminal 241 of the fourth switch 24 are common terminals of the SPDT switches 21, 22, 23, 24.

The first switch 21 connects the first transceiver 12 to the third switch 23. In one embodiment, the third terminal 211 of the first switch 21 is connected to the first terminal 232 of the third switch 23, the first terminal 212 of the first switch 21 is connected to the input 121 of the first transceiver 12, and the second terminal 213 of the first switch 21 is connected to the output 122 of the first transceiver 12.

The first control terminal 123 of the first transceiver 12 is connected to the first control terminal 214 of the first switch 21, and the second control terminal 124 of the first transceiver 12 is connected to the second control terminal 215 of the first switch 21. The first control terminal 123 and the second control terminal 124 of the first transceiver 12 are configured for outputting a first control signal, from the first transceiver 12 to the first switch 21, to selectively connect the third terminal 211 to the first terminal 212 or the second terminal 213 of the first switch 21.

In one embodiment, the first control signal may comprise a high level signal (e.g., a logical one) from the first control terminal 123 and a low level signal (e.g., a logical zero) from the second control terminal 124 generated by the first transceiver 12. In such a case, the third terminal 211 is connected to the first terminal 212 of the first switch 21.

Alternatively, the first control signal may comprise a low level signal from the first control terminal 123 and a high level signal from the second control terminal 124 generated by the first transceiver 12. In such a case, the third terminal 211 is connected to the second terminal 213 of the first switch 21.

The second switch 22 connects the second transceiver 14 to the third switch 23. In one embodiment, the third terminal 221 of the second switch 22 is connected to the second terminal 233 of the third switch 23, the first terminal 222 of the second switch 22 is connected to the first input 141 of the second transceiver 14, and the second terminal 223 of the second switch 22 is connected to the first output 142 of the second transceiver 14.

The first control terminal 143 of the second transceiver 14 is connected to the first control terminal 224 of the second switch 22, and the second control terminal 144 of the second transceiver 14 is connected to the second control terminal 225 of the second switch 22. The first control terminal 143 and the second control terminal 144 of the second transceiver 14 are configured for receiving a third control signal, from the second transceiver 14 to the second switch 22, to selectively connect the third terminal 221 to the first terminal 232 or the second terminal 223 of the second switch 22.

In one embodiment, the third control signal may comprise a high level signal from the first control terminal 143 and a low level signal from the second control terminal 144 generated by the second transceiver 14. In such a case, the third terminal 221 is connected to the first terminal 222 of the second switch 22.

Alternatively, the first control signal may comprise a low level signal from the first control terminal 143 and a high level signal from the second control terminal 144 generated by the second transceiver 14. In such a case, the third terminal 221 is connected to the second terminal 223 of the second switch 22.

The third terminal 231 of the third switch 23 is connected to the first terminal 252 of the first duplexer 25. The third control terminal 125 of the first transceiver 12 is connected to the first control terminal 234 of the third switch 23, and the fourth control terminal 126 of the first transceiver 14 is connected to the second control terminal 235 of the third switch 23. The third control terminal 125 and the fourth control terminal 126 of the first transceiver 14 are configured for outputting a second control signal, from the first transceiver 12 to the third switch 23, to selectively connect the third terminal 231 to the first terminal 232 or the second terminal 233 of the third switch 23.

In one embodiment, the second control signal may comprise a high level signal from the third control terminal 125 and a low level signal from the fourth control terminal 126 generated by the first transceiver 12. In such a case, the third terminal 231 is connected to the first terminal 232 of the third switch 23.

Alternatively, the second control signal may comprise a low level signal from the third control terminal 125 and a high level signal from the fourth control terminal 126 generated by the first transceiver 12. In such a case, the third terminal 231 is connected to the second terminal 233 of the third switch 23.

The third terminal 241 of the fourth switch 24 is connected to the second terminal 253 of the first duplexer 25, the first terminal 242 of the fourth switch 24 is connected to the second input 145 of the second transceiver 14, and the second terminal 243 of the fourth switch 24 is connected to the second output 146 of the second transceiver 14.

The third control terminal 147 of the second transceiver 14 is connected to the first control terminal 244 of the fourth switch 24, and the fourth control terminal 148 of the second transceiver 14 is connected to the second control terminal 245 of the fourth switch 24. The third control terminal 147 and the fourth control terminal 148 of the second transceiver 14 are configured for outputting a fourth control signal, from the second transceiver 14 to the fourth switch 24, to selectively connect the third terminal 241 to the first terminal 242 or the second terminal 243 of the fourth switch 24.

In one embodiment, the fourth control signal may comprise a high level signal from the third control terminal 147 and a low level signal from the fourth control terminal 148 generated by the second transceiver 14. In such a case, the third terminal 241 is connected to the first terminal 242 of the fourth switch 24.

Alternatively, the fourth control signal may comprise a low level signal from the third control terminal 147 and a high level signal from the fourth control terminal 148 generated by the second transceiver 14. In such a case, the third terminal 241 is connected to the second terminal 243 of the fourth switch 24.

The first duplexer 25 separates different frequency bands. In one embodiment, the common terminal 251 of the first duplexer 25 is connected to the first antenna 32.

As an example, when the first antenna 32 supports WLAN and WiMAX in cooperation, that is, working frequency bands in approximately 2.4 GHz and 3.5 GHz, the first terminal 252 and the second terminal 253 of the first duplexer 25 transceive signals in 2.4 GHz and 3.5 GHz, respectively. Alternatively, when the first antenna 32 supports WLAN and WiMAX by a time-division means, that is, working frequency bands ranging from 2.3 GHz to 2.5 GHz, including 2.4 GHz, the first terminal 252 of the first duplexer 25 transceives frequency bands ranging from 2.3 GHz to 2.5 GHz. As a further example, when the first antenna 32 supports BT and UWB in cooperation, that is, working frequency bands in 2.4 GHz and ranging from 3.1 GHz to 4.8 GHz, the first terminal 252 and the second terminal 253 of the first duplexer 25 transceive the 2.4 GHz and ranging from 3.1 GHz to 4.8 GHz, respectively. Finally, the duplexer 25 may support other frequency bands.

Figure 2:
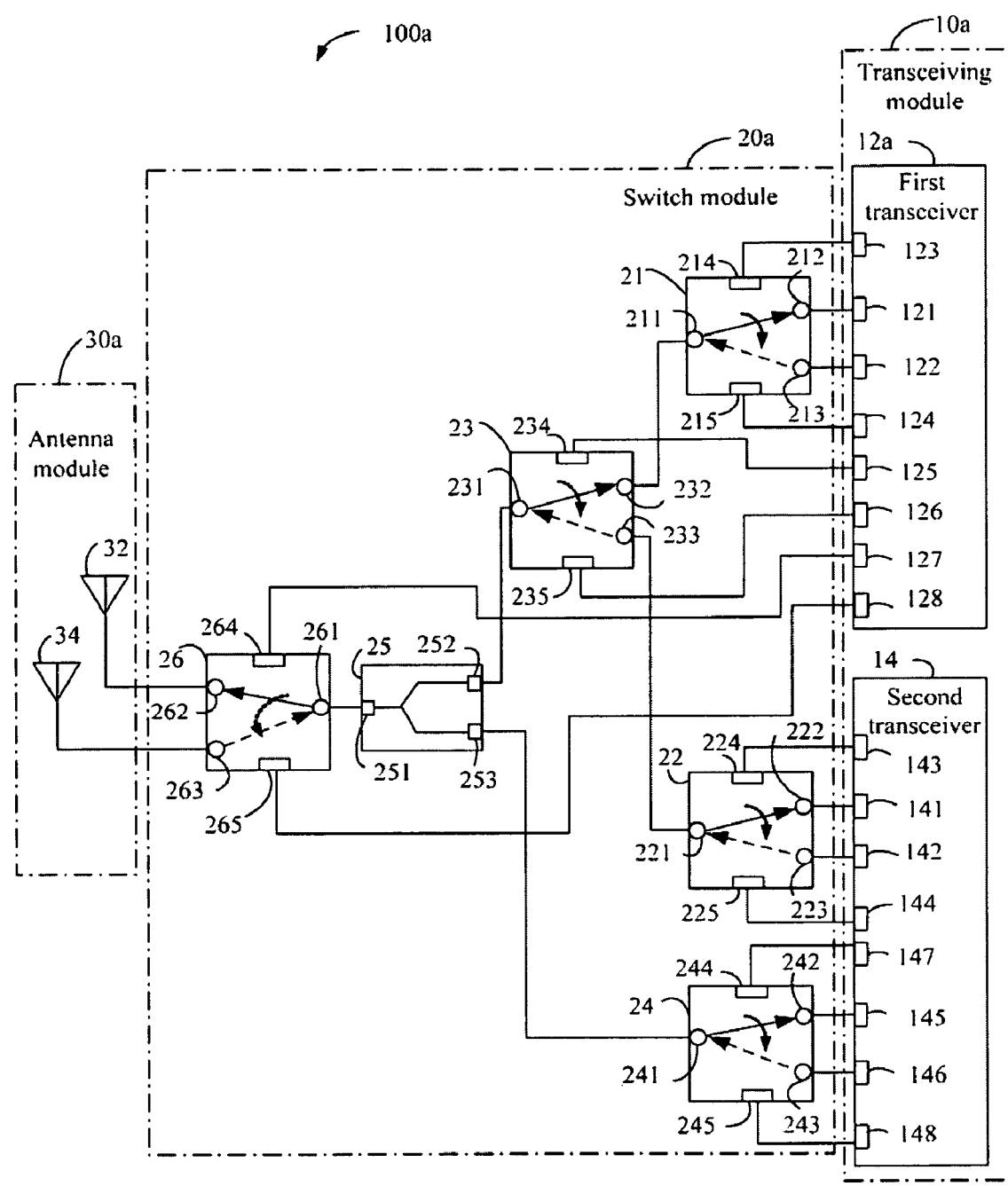
FIG. 2 is a circuit diagram of a second embodiment of a wireless communication device according to the present disclosure.

FIG. 2 is a circuit diagram of a second embodiment of a wireless communication device 100a according to the present disclosure, differing from the previous embodiment only in that an antenna module 30a further comprises a second antenna 34, a first transceiver 12a further comprises a fifth control terminal 127 and a sixth control terminal 128, and a switch module 20a further comprises a fifth switch 26.

The second antenna 34 works in the same frequency bands as the first antenna 32.

The fifth switch 26 comprises a first terminal 262, a second terminal 263, a common terminal 261, a first control terminal 264, and a second control terminal 265. The fifth switch 26 is an SPDT switch. The common terminal 261 of the fifth switch 26 is connected to the common terminal 251 of the first duplexer 25.

The fifth control terminal 127 and the sixth control terminal 128 of the first transceiver 12 are connected to the first control terminal 264 and the second control terminal 265 of the fifth switch 26, respectively. The fifth control terminal 127 and the sixth control terminal 128 of the first transceiver 12 are configured for outputting a fifth control signal from the first transceiver 12 to the fifth switch 26, to selectively connect the common terminal 261 to the first terminal 262 or the second terminal 263 of the fifth switch 26.

In one embodiment, the fifth control signal may comprise a high level signal from the fifth control terminal 127 and a low level signal from the sixth control terminal 128 generated by the first transceiver 12. In such a case, the common terminal 261 is connected to the first terminal 262 of the fifth switch 26.

Alternatively, the fifth control signal may comprise a low level signal from the fifth control terminal 127 and a high level signal from the sixth control terminal 128 generated by the first transceiver 12. In such a case, the common terminal 261 is connected to the second terminal 263 of the fifth switch 26.

Figure 3:
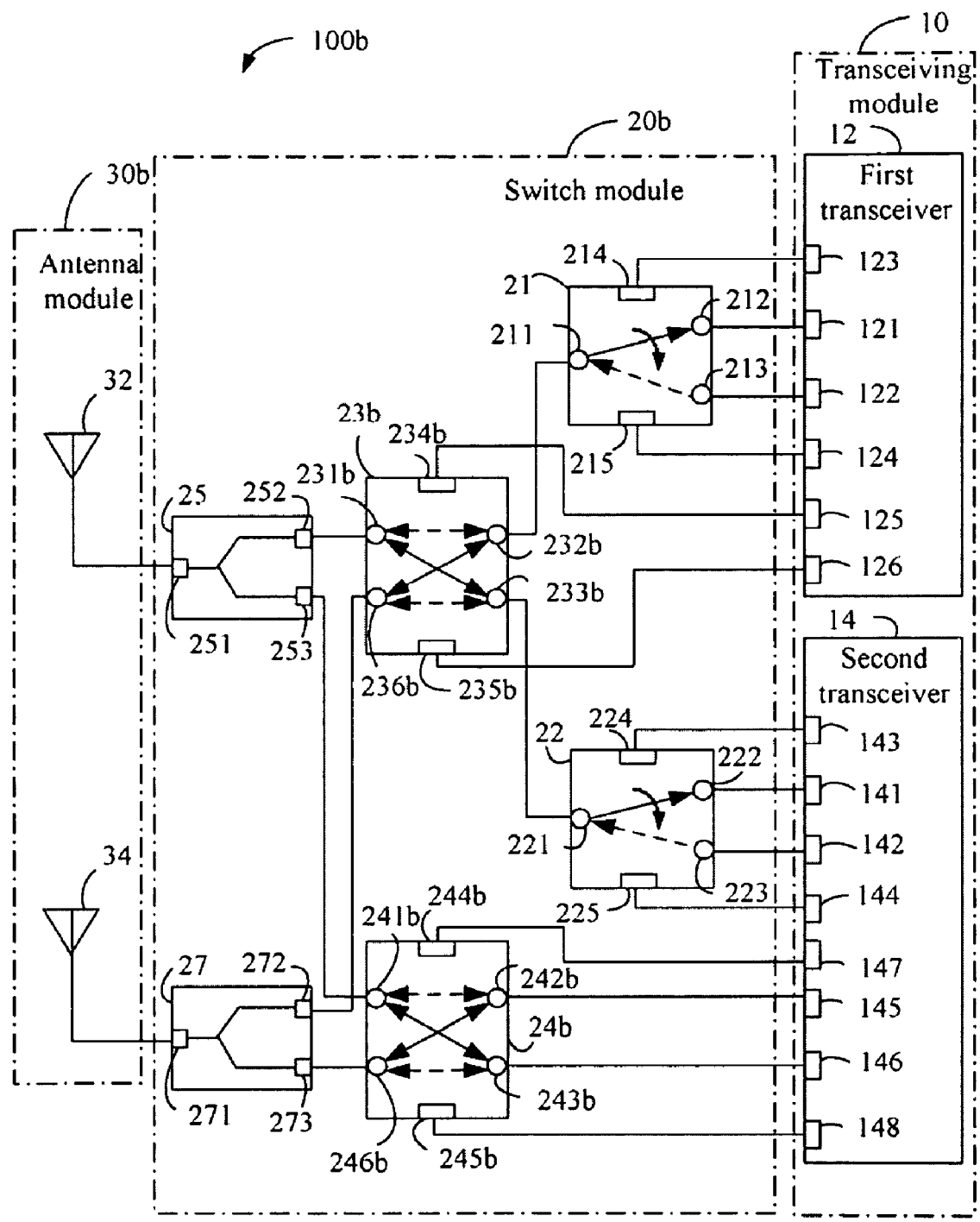
FIG. 3 is a circuit diagram of a third embodiment of a wireless communication device according to the present disclosure.

FIG. 3 is a circuit diagram of a third embodiment of a wireless communication device 100b according to the present disclosure, differing from the first embodiment only in an antenna module 30b further comprises a second antenna 34, a switch module 20b further comprises a second duplexer 27. In addition, a third switch 23b and a fourth switch 24b are double-pole-double-throw (DPDT) switches. The third switch 23b further comprises a fourth terminal 236b, and the fourth switch 24b further comprises a fourth terminal 246b.

The second antenna 34 works in the same frequency bands as the first antenna 32.

The common terminal 271 of the second duplexer 27 is connected to the second antenna 34. The second duplexer 27 has the same function as the first duplexer 25.

The connections of the first terminal 232b and the second terminal 233b of the third switch 23b in FIG. 3 are the same as the first terminal 232 and the second terminal 233 of the third switch 23 in FIG. 1. In addition, the third terminal 231b and the fourth terminal 236b of the third switch 23b are connected to the first terminal 252 of the first duplexer 25 and the first terminal 272 of the second duplexer 27, respectively.

When the second control signal comprises a high level signal from the third control terminal 125 and a low level signal from the fourth control terminal 126 generated by the first transceiver 12, the third terminal 231b is connected to the first terminal 232b, and the fourth terminal 236b is connected to the second terminal 233b of the third switch 23b.

Alternatively, when the second control signal comprises a low level signal from the third control terminal 125 and a high level signal from the fourth control terminal 126 generated by the first transceiver 12, the third terminal 231b is connected to the second terminal 233b, and the fourth terminal 236b is connected to the first terminal 232b of the third switch 23.

The connections of the first terminal 242b and the second terminal 243b of the fourth switch 24b in FIG. 3 are the same as the first terminal 242 and the second terminal 243 of the fourth switch 24 in FIG. 1. In addition, the third terminal 241b and the fourth terminal 246b of the fourth switch 24b are connected to the second terminal 253 of the first duplexer 25 and the second terminal 273 of the second duplexer 27, respectively.

When the fourth control signal comprises a high level signal from the third control terminal 147 and a low level signal from the fourth control terminal 148 generated by the second transceiver 14, the third terminal 241b is connected to the first terminal 242b, and the fourth terminal 246b is connected to the second terminal 243b of the fourth switch 24b.

Alternatively, when the second control signal comprises a low level signal from the third control terminal 147 and a high level signal from the fourth control terminal 148 generated by the second transceiver 14, the third terminal 241b is connected to the second terminal 243b, and the fourth terminal 246b is connected to the first terminal 242b of the fourth switch 24b.

It should be noted that the wireless communication device 100 of the present disclosure is not limited to the embodiments shown in the circuit diagrams of FIGS. 1-3, wherein each feature or element can be changed within the principles of the present disclosure. For example, the high and the low level signals of the control signals generated by the first transceiver 12 and the second transceiver 14 can also be exchanged according to different requirements. It may be understood that the switches 21, 22, 23, 24, and 26 may be cut off if their first and second control terminals, both receiving a high level signal or a low level signal.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A wireless communication device, comprising:
   a transceiving module comprising a first transceiver and a second transceiver;
   an antenna module comprising at least a first antenna configured for transmitting electromagnetic signals; and
   a switch module configured for switching different connections between the antenna module and the transceiving module, the switch module comprising:
   a first switch comprising a first terminal, a second terminal, and a third terminal, the first terminal and the second terminal of the first switch being connected to the first transceiver;
   a second switch comprising a first terminal, a second terminal, and a third terminal, the first terminal and the second terminal of the second switch being connected to the second transceiver;
   a third switch comprising a first terminal, a second terminal, and a third terminal, the first terminal and the second terminal of the third switch being connected to the third terminal of the first switch and the third terminal of the second switch, respectively;
   a fourth switch comprising a first terminal, a second terminal, and a third terminal, the first terminal and the second terminal of the fourth switch being connected to the second transceiver; and
   a first duplexer comprising a first terminal, a second terminal, and a common terminal, the first terminal and the second terminal of the first duplexer being connected to the third terminal of the third switch and the third terminal of the fourth switch, respectively; wherein the common terminal of the first duplexer is connected to the first antenna.

2. The wireless communication device as claimed in claim 1, wherein the first transceiver comprises an input connected to the first terminal of the first switch and an output connected to the second terminal of the first switch.

3. The wireless communication device as claimed in claim 2, wherein the first switch further comprises a first control terminal and a second control terminal, and the first transceiver further comprises a first control terminal and a second control terminal connected to the first control terminal and the second control terminal of the first switch, respectively; the first control terminal and the second control terminal of the first transceiver configured for outputting a first control signal to the first switch to selectively connect the third terminal of the first switch to the first terminal or the second terminal of the first switch.

4. The wireless communication device as claimed in claim 3, wherein the third switch further comprises a first control terminal and a second control terminal, and the first transceiver further comprises a third control terminal and a fourth control terminal connected to the first control terminal and the second control terminal of the third switch, respectively; the third control terminal and the fourth control terminal of the first transceiver configured for outputting a second control signal to the third switch to selectively connect the third terminal of the third switch to the first terminal or the second terminal of the third switch.

5. The wireless communication device as claimed in claim 4, wherein the second transceiver comprises a first input connected to the first terminal of the second switch, a first output connected to the second terminal of the second switch, a second input connected to the first terminal of the fourth switch, and a second output connected to the second terminal of the fourth switch.

6. The wireless communication device as claimed in claim 5, wherein the second switch comprises a first control terminal and a second control terminal, and the second transceiver comprises a first control terminal and a second control terminal connected to the first control terminal and the second control terminal of the second switch, respectively; the first control terminal and the second control terminal of the second transceiver configured for outputting a third control signal to the second switch to selectively connect the third terminal of the second switch to the first terminal or the second terminal of the second switch.

7. The wireless communication device as claimed in claim 6, wherein the fourth switch comprises a first control terminal and a second control terminal, and the second transceiver further comprises a third control terminal and a fourth control terminal connected to the first control terminal and the second control terminal of the fourth switch, respectively; the third control terminal and the fourth control terminal of the second transceiver configured for outputting a fourth control signal to the fourth switch to selectively connect the third terminal of the fourth switch to the first terminal or the second terminal of the fourth switch.

8. The wireless communication device as claimed in claim 7, wherein the third switch and the fourth switch are single-pole-double-throw (SPDT) switches, and the third terminal of the third switch and the fourth switch are common terminals.

9. The wireless communication device as claimed in claim 8, wherein:
the antenna module further comprises a second antenna configured for transmitting electromagnetic signals in the same frequency range as the first antenna;
the switch module further comprises a fifth switch, the fifth switch comprising a first control terminal, a second control terminal, a first terminal, a second terminal, and a common terminal, wherein the first terminal and the second terminal of the fifth switch are connected to the first antenna and the second antenna, respectively; wherein the common terminal of the fifth switch is connected to the common terminal of the first duplexer.

10. The wireless communication device as claimed in claim 9, wherein the first transceiver further comprises a fifth control terminal and a sixth control terminal connected to the first control terminal and the second control terminal of the fifth switch, respectively; the fifth control terminal and the sixth control terminal of the first transceiver configured for outputting a fifth control signal to the fifth switch to selectively connect the common terminal to the first terminal or the second terminal of the fifth switch.

11. The wireless communication device as claimed in claim 4, wherein the third switch further comprises a fourth terminal, wherein the second control signal is further configured for connecting the fourth terminal and the first terminal or connecting the fourth terminal and the second terminal.

12. The wireless communication device as claimed in claim 11, wherein the second transceiver comprises a first input connected to the first terminal of the second switch, a first output connected to the second terminal of the second switch, a second input connected to the first terminal of the fourth switch, and a second output connected to the second terminal of the fourth switch.

13. The wireless communication device as claimed in claim 12, wherein the second switch further comprises a first control terminal and a second control terminal, and the second transceiver further comprises a first control terminal and a second control terminal connected to the first control terminal and the second control terminal of the second switch, respectively; the first control terminal and the second control terminal of the second transceiver configured for outputting a third control signal from the second transceiver to the second switch to selectively connect the third terminal of the second switch to the first terminal or the second terminal of the second switch.

14. The wireless communication device as claimed in claim 13, wherein the fourth switch further comprises a fourth terminal, a first control terminal and a second control terminal, and the second transceiver further comprises a third control terminal and a fourth control terminal connected to the first control terminal and the second control terminal of the fourth switch, respectively; the third control terminal and the fourth control terminal of the second transceiver configured for outputting a fourth control signal to the fourth switch to connect the first terminal and the second terminal to the corresponding third terminal and the fourth terminal of the fourth switch.

15. The wireless communication device as claimed in claim 14, wherein the third switch and the fourth switch are double-pole-double-throw (DPDT) switches.

16. The wireless communication device as claimed in claim 15, wherein
the antenna module further comprises a second antenna;
the switch module further comprises a second duplexer, the second duplexer comprising a first terminal, a second terminal, and a common terminal, wherein the first terminal of the second duplexer is connected to the fourth terminal of the third switch, the second terminal of the second duplexer is connected to the fourth terminal of the fourth switch, and the common terminal of the second duplexer is connected to the second antenna.

17. A wireless communication device, comprising:
a transceiver module to transceive wireless frequencies in at least two frequency bands, the transceiver module comprising a first transceiver to transceive wireless frequencies in a first frequency band and a second transceiver to transceive wireless frequencies in a second frequency band;
an antenna configured for transmitting electromagnetic signals in at least two frequency bands; and
a switch module comprising a plurality of switches, the switch module electronically connected between the antenna and the transceiver module, the switch module configured for selectively receiving control signals from the transceiver to a plurality of switches, the plurality of switches comprising:
a first switch configured for receiving a first control signal from the first transceiver to selectively connect the common terminal of the first switch to the first terminal or the second terminal of the first switch;
a third switch configured for receiving a second control signal from the first transceiver to selectively connect the third terminal of the third switch to the first terminal or the second terminal of the third switch;
a second switch configured for receiving a third control signal from the second transceiver to selectively connect the third terminal of the second switch to the first terminal or the second terminal of the second switch;
a fourth switch configured for receiving a fourth control signal from the second transceiver to selectively connect the third terminal of the fourth switch to the first terminal or the second terminal of the fourth switch; and
a duplexer connected to the third terminal of the third switch and the third terminal of the fourth switch, wherein a common terminal of the duplexer is connected to the antenna.

* * * * *